United States Patent
Havens et al.

(10) Patent No.: US 8,596,543 B2
(45) Date of Patent: Dec. 3, 2013

(54) INDICIA READING TERMINAL INCLUDING FOCUS ELEMENT WITH EXPANDED RANGE OF FOCUS DISTANCES

(75) Inventors: William H. Havens, Syracuse, NY (US); Ynjiun P. Wang, Cupertino, CA (US); Robert J. Hennick, Cayuga, NY (US); Colleen Gannon, Jordan, NY (US); Donald Anderson, Locke, NY (US); Vivian L. Hunter, Baldwinsville, NY (US); Edward C. Bremer, Victor, NY (US); Chen Feng, Snohomish, WA (US)

(73) Assignee: Hand Held Products, Inc., Fort Mill, SC (US)

( * ) Notice: Subject to any disclaimer, the term of this patent is extended or adjusted under 35 U.S.C. 154(b) by 378 days.

(21) Appl. No.: 12/582,216

(22) Filed: Oct. 20, 2009

(65) Prior Publication Data

US 2011/0089245 A1    Apr. 21, 2011

(51) Int. Cl.
*G06K 7/10*    (2006.01)

(52) U.S. Cl.
USPC .............. 235/472.01; 235/462.32; 235/454

(58) Field of Classification Search
USPC .............. 235/435, 439, 454, 462.32, 462.41, 235/472.01
See application file for complete search history.

(56) References Cited

U.S. PATENT DOCUMENTS

| | | | |
|---|---|---|---|
| 4,784,479 A * | 11/1988 | Ikemori | 359/666 |
| 4,794,581 A | 12/1988 | Andresen | |
| 5,656,805 A | 8/1997 | Plesko | |
| 5,917,657 A * | 6/1999 | Kaneko et al. | 359/661 |
| 5,932,860 A | 8/1999 | Plesko | |
| 6,390,370 B1 | 5/2002 | Plesko | |
| 6,641,044 B2 | 11/2003 | Plesko | |
| 6,769,769 B2 | 8/2004 | Podoleanu et al. | |
| 6,859,275 B2 | 2/2005 | Fateley et al. | |
| 6,959,870 B2 | 11/2005 | Tsikos et al. | |
| 7,083,096 B2 | 8/2006 | Breytman et al. | |
| 7,180,588 B2 | 2/2007 | Geshwind et al. | |
| 7,219,086 B2 | 5/2007 | Geshwind et al. | |
| 7,248,358 B2 | 7/2007 | Geshwind et al. | |
| 7,527,200 B2 | 5/2009 | Tsikos et al. | |
| 7,562,057 B2 | 7/2009 | Maggioni et al. | |
| 7,652,765 B1 | 1/2010 | Geshwind et al. | |
| 7,918,398 B2 | 4/2011 | Li et al. | |
| 8,027,095 B2 | 9/2011 | Havens | |
| 8,027,096 B2 | 9/2011 | Feng et al. | |
| 2002/0057431 A1 | 5/2002 | Fateley et al. | |
| 2003/0062422 A1 | 4/2003 | Fateley et al. | |
| 2004/0218172 A1 | 11/2004 | DeVerse et al. | |

(Continued)

OTHER PUBLICATIONS

U.S. Appl. No. 60/875,245, filed Dec. 15, 2006. (97 pages).

*Primary Examiner* — Ahshik Kim
(74) *Attorney, Agent, or Firm* — Additon, Higgins, Pendleton & Ashe, P.A.

(57) ABSTRACT

Embodiments of the present invention comprise an indicia reading terminal including a focus element that extends the range of focus distances at which the indicia reading terminal can decode decodable indicia. In one embodiment, the focus element comprises a variable form element and a variable position element, the combination of which causes an image distance that can change in accordance with a separation distance between these two elements. The focus element can comprise an actuator, e.g., a piezoelectric actuator, which can be coupled to the variable position element in a manner that can cause the variable position element to deform the variable form element, and in one example, the deformation changes the focal length of the variable form element.

20 Claims, 9 Drawing Sheets

(56) References Cited

U.S. PATENT DOCUMENTS

| | | |
|---|---|---|
| 2005/0024640 A1 | 2/2005 | Fateley et al. |
| 2005/0243312 A1 | 11/2005 | Geshwind et al. |
| 2005/0254709 A1 | 11/2005 | Geshwind et al. |
| 2005/0270528 A1 | 12/2005 | Geshwind et al. |
| 2006/0074835 A1 | 4/2006 | Maggioni et al. |
| 2006/0092414 A1 | 5/2006 | Geshwind et al. |
| 2006/0197865 A1 | 9/2006 | Birecki et al. |
| 2007/0012777 A1 | 1/2007 | Tsikos et al. |
| 2007/0063048 A1 | 3/2007 | Havens et al. |
| 2007/0080280 A1 | 4/2007 | Havens |
| 2007/0156021 A1 | 7/2007 | Morse et al. |
| 2007/0263214 A1 | 11/2007 | Fateley et al. |
| 2008/0144185 A1* | 6/2008 | Wang et al. .................... 359/665 |
| 2008/0144186 A1* | 6/2008 | Feng et al. .................... 359/666 |
| 2008/0156882 A1 | 7/2008 | Tsikos et al. |
| 2009/0072038 A1 | 3/2009 | Li et al. |
| 2010/0276491 A1 | 11/2010 | Havens et al. |
| 2010/0276492 A1 | 11/2010 | Wang et al. |
| 2011/0089245 A1 | 4/2011 | Havens et al. |
| 2011/0174880 A1 | 7/2011 | Li et al. |
| 2011/0212751 A1 | 9/2011 | Havens et al. |

\* cited by examiner

INDICIA READING TERMINAL INCLUDING FOCUS ELEMENT WITH EXPANDED RANGE OF FOCUS DISTANCES

FIELD OF THE INVENTION

The present invention relates to indicia reading terminals, and more particularly, to focus elements for indicia reading terminals that have optical properties, which extend the range of focus distances of the indicia reading terminal.

BACKGROUND OF THE INVENTION

Indicia reading terminals are available in multiple varieties. Well-known among the varieties is the gun style terminal as commonly seen at retail store checkout counters. Other terminals are also available that provide enhanced functions, have keyboards, and displays, and include advanced networking communication capabilities. All of these terminals can be used in myriad of applications, including warehouses where the decodable indicia (e.g., the bar codes) may be located at great distances away from the operator of the indicia reading terminal.

A problem with such applications, however, is that the distance between the indicia reading terminal and the decodable indicia can often render the terminal ineffective at decoding the decodable indicia. Although terminals can be constructed for such specific "long distance" applications, this can generally reduce the effectiveness of the terminal for normal applications, and more particularly, for "close distance" applications where the decodable indicia is within millimeters (and/or centimeters) of the operator. That is, the focus distance required in order for the terminal to decode the decodable indicia at "long distances" and at "close distances" is simply outside the range of most commercially available indicia reading terminals.

Therefore, there is a recognized need for an indicia reading terminal that is effective to read decodable indicia at both long distances and close distances. This is optimally provided on a single platform, and thus it is desirable to construct the indicia reading terminal in a manner that provides such extend range of focus distances. It is further desirable that the optics, and other focus elements that are employed by such indicia reading terminals are configured so as to fit within indicia reading terminals with form factors consistent with the form factors of hand held devices of similar functionality that are recognized in the industry.

SUMMARY OF THE INVENTION

As discussed in more detail below, there is provided embodiments of a focus element, and implementations thereof, e.g., indicia reading terminals, with a range of focus distances for use with long distance and close distance decoding of decoding indicia.

In one embodiment, concepts of the present invention can be embodied as an optical system comprising a first optical element having an optical axis and a focal length. The first optical element can comprise a deformable element. The optical system can also comprise a second optical element aligned with the optical axis. This second optical element can have a plurality of positions along the optical axis; the positions can comprise a first position, and a second position that is different than the first position. The optical system can be operatively configured wherein the second position on the optical axis locates an end of the second optical element in communication with the deformable element. This position can cause the deformable element to deform in a manner that changes the focal length of the first optical element from a first focal length to a second focal length that is different from the first focal length.

In another embodiment, concepts of the present invention can be embodied as hand held indicia reading terminal for use in reading of decodable indicia. The hand held indicia reading terminal can comprise an image sensor, and an optical system for focusing an image onto the image sensor. The optical system can comprise a first optical element having an optical axis and a focal length, where the first optical element can also comprise a deformable membrane. The optical system can also comprise a second optical element that can be aligned with the optical axis at a plurality of positions; these positions can comprise a first position, and a second position that is different from the first position. The hand held indicia reading terminal can further comprise a hand held housing in surrounding relation to one or more of the image sensor, and the optical system. The hand held indicia reading terminal can be operatively configured wherein the second position on the optical axis locates an end of the second optical element in communication with the deformable membrane. This position can cause the deformable membrane to deform in a manner that changes the focal length from a first focal length to a second focal length that is different from the first focal length.

In yet another embodiment, the concepts of the present invention can be embodied as a method of focusing an image of a decodable indicia on an image capture device. The method can comprise securing on an optical axis a variable form element having a focal length; the variable form element can comprise a deformable element. The method can also comprise aligning on the optical axis a variable position element at a separation distance from the variable form element. The variable position element can comprise an elongated barrel, and a lens assembly disposed in the elongated barrel, the lens assembly having a fixed focal length. The method can further comprise setting the separation distance for attempting to decode a decodable indicia located at a focus distance from the variable form element by correlating the focus distance to the separation distance.

BRIEF DESCRIPTION OF THE DRAWINGS

So that the manner in which the above recited features of the present invention can be understood in detail, a more particular description of the invention briefly summarized above, may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Moreover, the drawings are not necessarily to scale, emphasis generally being placed upon illustrating the principles of certain embodiments of invention.

Thus, for further understanding of the concepts of the invention, reference can be made to the following detailed description, read in connection with the drawings in which.

DETAILED DESCRIPTION OF THE INVENTION

Figure 1:
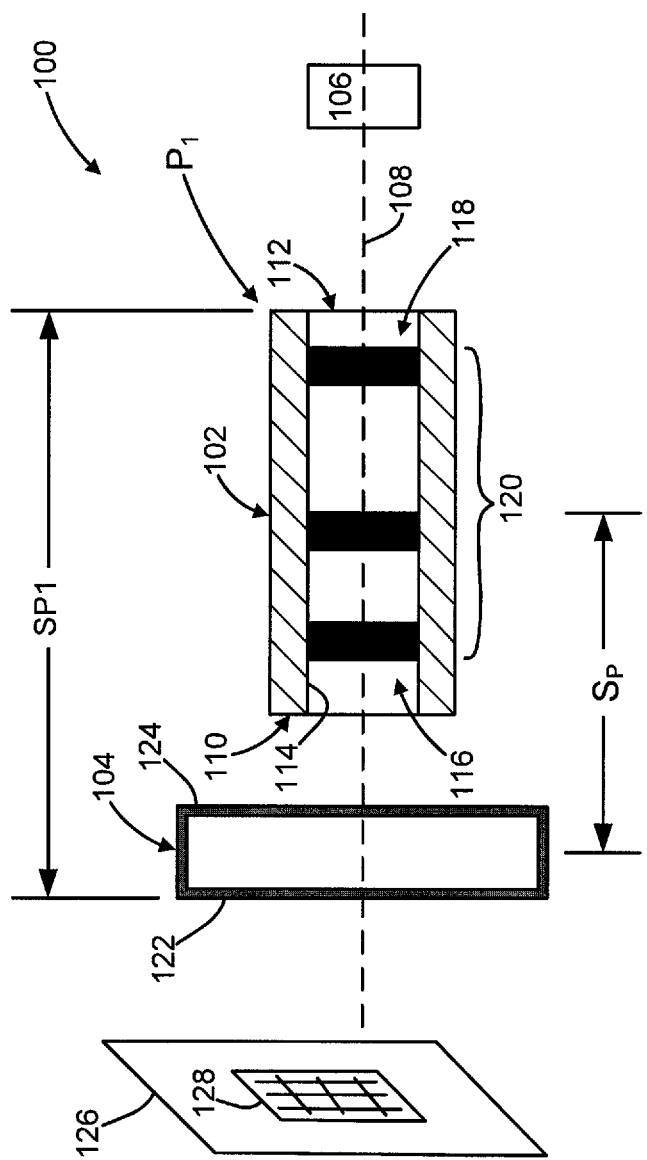
FIG. 1 is a schematic diagram of one example of a focus element that is made in accordance with concepts of the present invention.

With reference to the drawings, in general, and FIGS. 1-11 in particular, there is described herein devices, systems, and methods, embodiments of which are useful to extend the operating range of indicia reading terminals, e.g., bar code scanners. This feature can be provided, in one embodiment, so that the indicia reading terminal can be configured to operate at a plurality of focus distances, and more particularly at extreme ends of a focus distance spectrum using a single indicia reading terminal device. So when implemented in the indicia reading terminals, such embodiments permit the indicia reading terminals to read, image, and otherwise interact with decodable indicia that are located at focus distances in excess of about 12 m, and less than about 0.1 m. In one particular implementation, concepts of the present invention permit the indicia reading terminal to read decodable indicia from about 3 m to about 0.1 m from the terminal device.

It is disclosed, and described below that one embodiment of the invention can comprise an optical system with a plurality of optical elements. These optical elements can mechanically interact with one another in a manner that accommodates the range of focus distances described above. Each of the optical elements can exhibit optical properties, which can be described in terms of one or more of a focal length (f), an object distance (P), and an image distance (Q). In one particular example of the optical system, the optical elements are arranged together so that the indicia reading terminal exhibits a best focus distance (also known and referred to generally as the best object focus distance) (P'), which is discussed in more detail below. As used herein, the terms "focus distance," "best focus distance," and "best object focus distance," describe the distance from the terminal to the plane of nominal focus.

Construction of the optical system and each of the optical elements can be selected based generally on the desired range of focus distances for the indicia reading terminal. In one embodiment, there may be found in the optical system a plurality of optical elements that can be particularly configured, and proximately mounted along an optical axis, so as to cause the best focus distance (P'). The optical elements may include a variable form element with a focal length ($f_{vf}$), and a variable position element with a focal length ($f_{vp}$). The variable position element can be separated from the variable form element by a separation distance, generally designated as the separation distance ($S_P$) in the FIGS. 1-3.

The best focus distance (P') for this optical system can be provided by the following Equation 1 below, $$P' = f_{vf}\left(\frac{S_P L_{vf} - S_P^2 - f_{vp} L_{vf}}{S_P L_{vf} - S_P^2 - f_{vp} L_{vf} - f_{vf} L_{vf} + f_{vf} S_P + f_{vp} f_{vf}}\right), \quad \text{Equation (1)}$$

where P' is the best focus distance, $S_P$ is the separation distance, $L_{vf}$ is the distance from an image capture device (e.g., a charge coupled device ("CCD"), a complimentary metal-oxide-semiconductor device ("CMOS")) to the variable form element, $f_{vp}$ is the focal length of the variable position element, and $f_{vf}$ is the focal length of the variable form element. Details of the Equation 1 are provided in connection with the discussion of FIGS. 1-4 below. Before continuing with those details, however, a general discussion of the principles of Equation 1, as they relate to an implementation of the optical system are provided immediately below.

That is, in one implementation the focal length of the variable form element ($f_{vf}$) can be negligible, e.g., infinite, or even slightly divergent, when decoding decodable indicia that are located at distances greater than about 0.5 m from the indicia reading terminal. Here, to achieve the best focus distance (P'), the separation distance ($S_P$) can be varied, e.g., by moving the variable position element along the optical axis. In another implementation, the focal length of the variable form element ($f_{vf}$) can be changed to decode decodable indicia that are located at distances less than about 0.5 m from the indicia reading terminal. In yet other implementations of the optical system, decoding of decodable indicia that are located from the indicia reading terminal at distances greater than, less than, and equal to about 0.5 m can be accomplished by changing the focal length of the variable form element ($f_{vf}$), such as by moving the variable position element relative to the variable form element.

As mentioned immediately above, the variable position element can be moved relative to the variable form element so as to change the focal length of the variable form element ($f_{vf}$). This relative movement can cause the variable position element to deform the variable form element such as by contact with a surface of the variable form element. The contact can shape a portion of the variable form element, which can change the focal length of the variable form element ($f_{vf}$) from a nominal value, e.g., infinite, to a value that is more or less convergent than the nominal value. In one example, the relative movement can make the focal length of the variable form element ($f_{vf}$) more convergent such as by causing a convex shape to form on one surface of the variable form element. This convex shape can extend outward a radial dimension R, and in one construction of the optical system the optical elements are arranged so that the shape extends towards the variable position element. The radial dimension R can increase, and decrease in response to the relative position of the variable position element with respect to the variable form element. For example, changing the relative position may increase the force and/or pressure applied by the variable position element on the surface of the variable form element, which can decrease the radial dimension R of the convex shape.

Detailed construction of examples of each of the variable form element and the variable position element are provided below. In these examples, it is illustrated that the variable form element can comprise at least one deformable membrane that is responsive to the pressure applied, either directly or indirectly, by the variable position element. It is also illustrated that the variable position element can be constructed with a lens assembly, which can have optical properties compatible with, e.g., the desired focus distances of the indicia reading terminal. The lens assembly may comprise a number of lens elements, which can include, for example, fluid elements, electro-wetting fluid elements, and/or non-deformable solid elements (e.g., glass, polycarbonate). Each of these lens elements can be dimensioned, spaced, positioned, and generally constructed as part of the variable position element, an example of which is discussed in connection with the variable position element illustrated in FIG. 6 and described below.

Figure 2:
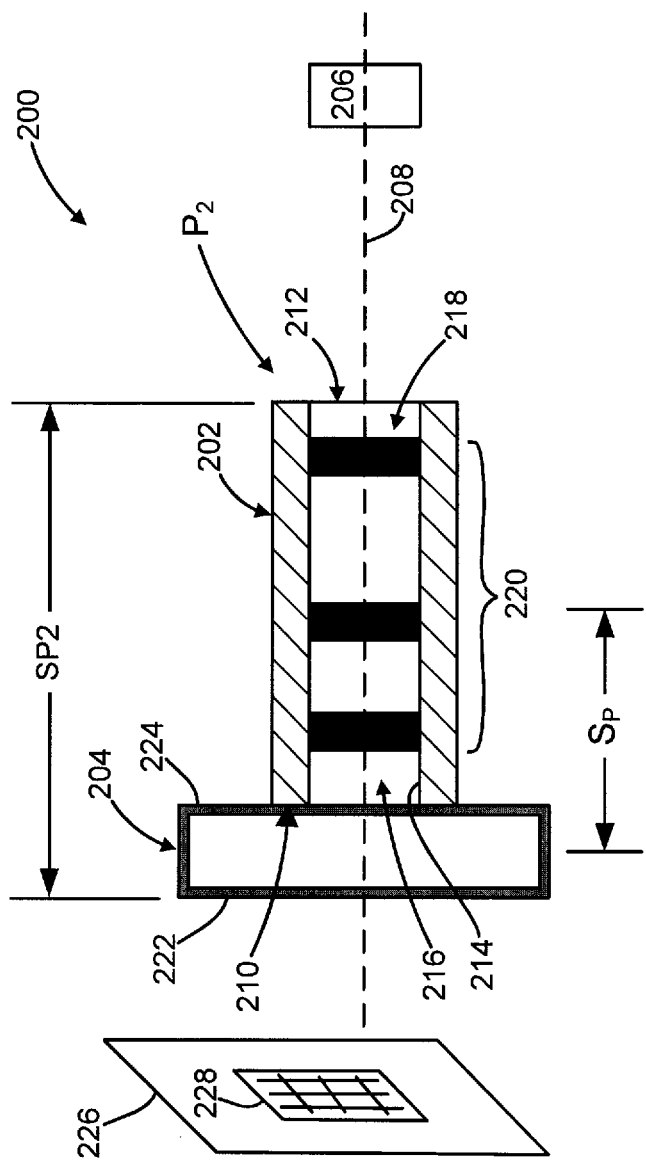
FIG. 2 is a schematic diagram of another example of a focus element that is made in accordance with concepts of the present invention, the focus element having a focus distance that is different from the focus distance of the focus element of FIG. 1.
Figure 3:
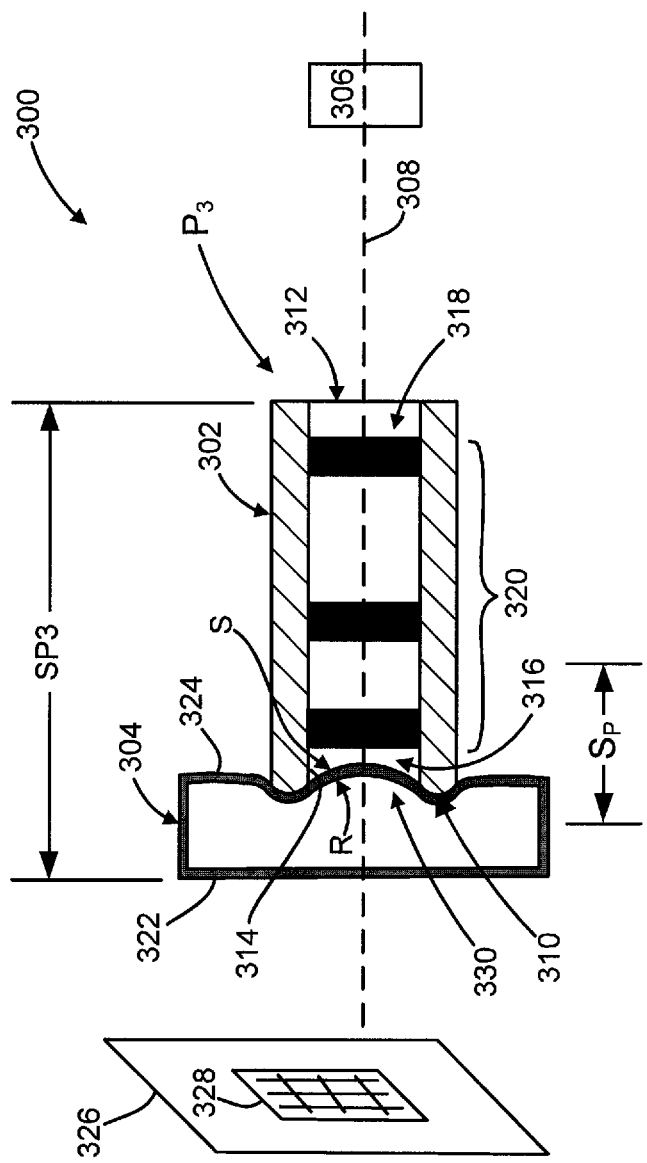
FIG. 3 is a schematic diagram of yet another example of a focus element that is made in accordance with concepts of the present invention, the focus element having a focus distance that is different from the focus distance of the focus elements of FIGS. 1 and 2.

Discussing the interaction between the variable position element and the variable form element in more detail, reference can be had to FIGS. 1-3 and the description that follows immediately below. There are illustrated in FIGS. 1-3 schematic, cross-sectional diagrams of examples of a focus element 100, 200, 300 that are made in accordance with concepts of the present invention. At a high level, the focus element 100 of FIG. 1 comprises a variable position element 102, a variable form element 104, an image capture device 106, and an optical axis 108, on which is aligned the variable position element 102, the variable form element 104, and the image capture device 106. The variable position element 102 can be located in a first position P1, which can generally be defined by a separation distance (SP), and more particularly defined by a first separation distance SP1 that measures the relative position of the variable position element 102 with respect to the variable form element 104.

The variable position element 102 can comprise a distal end 110, a proximal end 112, and an interior bore 114 with a distal opening 116 and a proximal opening 118. Inside of the interior bore 114 can be located a lens assembly 120. The variable form element 104 can comprise an object side 122, which can be constructed of deformable and non-deformable materials, and a deformable side 124 that can be positioned in facing relation to the distal end 110 of the variable position element 102. There is also illustrated in FIG. 1 an object 126 on which is positioned a decodable indicia 128.

In the examples of the focus elements 200 and 300, like numerals are used to identify like components that are identified in FIG. 1, except the numerals for focus elements 200, 300 are increased, respectively, by 100 and 200 (e.g., 100 becomes 200, 100 becomes 300). Without recitation of similar components, it is seen in the example of FIG. 2 that the focus element 200 can comprise a variable position element 202 in a second position P2, and a variable form element 204, both of which can be disposed on an optical axis 208. These elements can be co-located in a second separation distance SP2 that, like the first separation distance SP1, measures the relative position of the variable position element 202 with respect to the variable form element 204. It is also seen in the example of FIG. 3 that the focus element 300 can comprise a variable position element 302 in a third position P3, this third position P3 can be defined by a third separation distance SP3 measured with respect to the variable position element 302 and the variable form element 304.

In the present examples, the focal length f for a lens and/or lens assembly (collectively, "lens") for a specified geometrical situation is related to the object and image distances, as can be determined from the Equation 2 (the "lens equation") below, $$\frac{1}{f} = \frac{1}{p} + \frac{1}{q}, \qquad \text{Equation (2)}$$

in which f is the focal length of a lens (e.g., the variable position element 102, 202, 302, and/or the variable form element 104, 204, 304), q is a distance from the lens to a surface at which a desired image is observed such as an imaging sensor or a photographic film (e.g., the image capture device 106), and p is a distance between the lens and the object being observed. Applying the lens equations to embodiments of the present invention, and with reference to the schematic diagram of FIG. 4 that is representative of the optical properties of the focus elements 100, 200, 300, the lens equation can be used to describe such optical properties for each of the variable form element VFE and the variable position element VPE. This application is presented below such as, respectively, by Equations 3 and 4 below, $$\frac{1}{f_{vf}} = \frac{1}{P_{vf}} + \frac{1}{Q_{vf}}, \qquad \text{Equation (3)}$$

$$\frac{1}{f_{vp}} = \frac{1}{P_{vp}} + \frac{1}{Q_{vp}}, \qquad \text{Equation (4)}$$

where $f_{vf}$ is the focal length of the variable form element, $Q_{vf}$ is the distance from the variable form element to an intermediate image of the object I', $P_{vf}$ is the object distance from the variable form element to the object O, $f_{vp}$ is the focal length of the variable position element, $Q_{vp}$ is the distance from the variable position element to the image of the object $I_{VPE}$, and $P_{vp}$ is the distance from the variable position element to the intermediate object I'.

The variable position object distance $P_{vp}$ is related to the separation distance $S_P$ by the expression illustrated in Equation 5 below, $$P_{vp} = S_P - Q_{vf} \qquad \text{Equation (5)}$$

Figure 4:
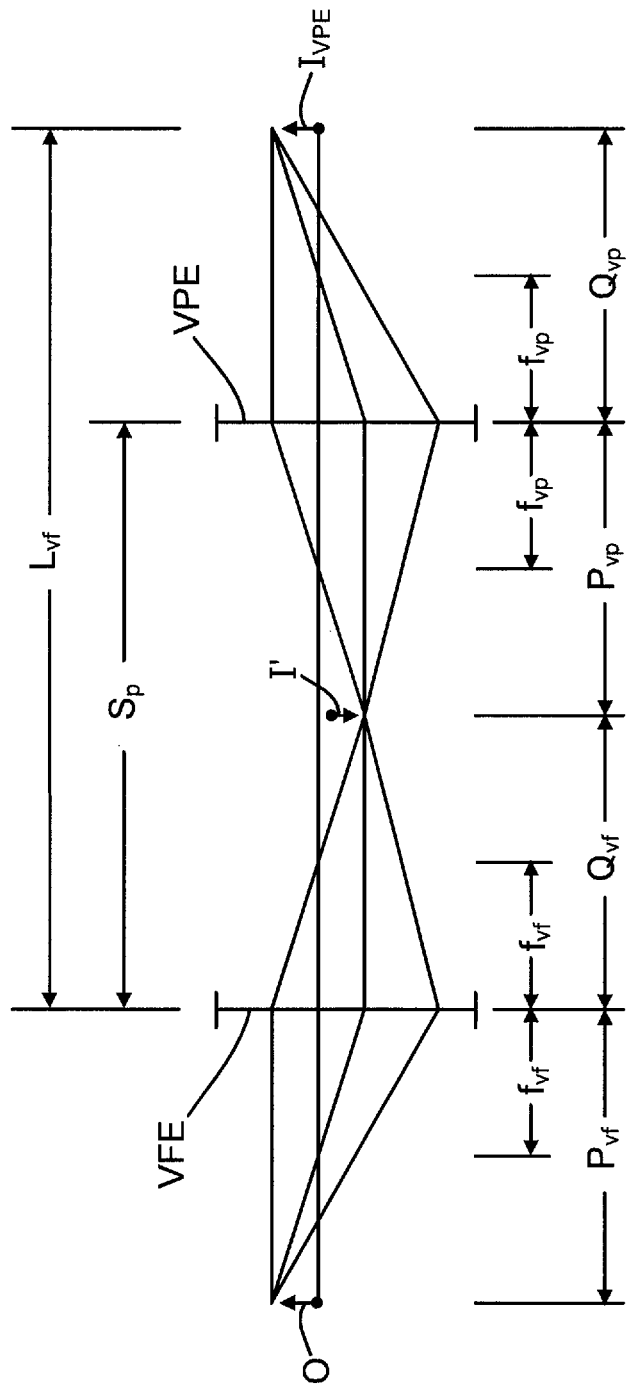
FIG. 4 is a schematic illustration of the optical properties of another example of a focus element, such as the focus elements of FIGS. 1-3.

As it is illustrated in the example of FIG. 4, the distance $Q_{vp}$ from the variable position element to the image of the object can be written as in Equation (6), $$Q_{vp} = L_{vf} - S_P \qquad \text{Equation (6)}$$

where $L_{vf}$ is the distance from the image capture device to the variable form element. These four equations, e.g., equations 3-6 above, can be solved for $P_{vf}$, as illustrated in Equation 7 below. The result is similar to the Equation 1 and can be used to express the best focus distance P', as represented immediately below, $$P' = P_{vf} \qquad \text{Equation (}$$

-continued $$= f_{vf}\left(\frac{S_P L_{vf} - S_P^2 - f_{vp}L_{vf}}{S_P L_{vf} - S_P^2 - f_{vp}L_{vf} - f_{vf}L_{vf} + f_{vf}S_P + f_{vp}f_{vf}}\right).$$

Equation 7 demonstrates that the focus distance $P_{vf}$ of the focus element 100, 200, 300 can be correlated to the separation distance $S_P$. So one embodiment of the focus element 100, 200, 300 can be configured to accommodate a broad range of focus distances, e.g., by moving the variable position element relative to the variable form element so as to change the separation distance $S_P$. For example, as is more clearly illustrated by comparing the focus elements 100, 200 of FIGS. 1-2, it is seen that the variable position element can be moved from the first position P1 (FIG. 1), to the second position P2 (FIG. 2) where the value of the second separation distance SP2 (FIG. 2) is less than the value of the first separation distance SP1 (FIG. 1). This, in turn, changes the separation distance $S_P$, and more particularly the separation distance $S_P$ is reduced by an amount equal to the difference between the first separation distance SP1 and the second separation distance SP2. Examining the Equation 7 above, it is seen that such reduction in the separation distance $S_P$ can change the best focus distance P'.

Another embodiment of the focus element 100, 200, 300 can also be configured to accommodate the range of focus distances, e.g., by moving the variable position element relative to the variable form element so as to alter the shape of the variable form element. For example, and by comparing next the focus elements 200, 300 of FIGS. 2-3, it is seen that relative movement of the variable position element from the second position P2 (FIG. 2) to the third position P3 (FIG. 3) changes the separation distance $S_P$ by an amount equal to the difference between the second separation distance SP2 (FIG. 2) and the third separation distance SP3 (FIG. 3). This change causes a shape S with a radial dimension R to form in the deformable side 324 of the variable form element 304.

In one embodiment, the focal length ($f_{vf}$) of the variable form element 304, which has shapes such as shape S can be defined by Equation 8 below, $$\frac{1}{f_{vf}} = (n-1)\left[\frac{1}{R_1} - \frac{1}{R_2}\right], \quad \text{Equation (8)}$$

in which $f_{vf}$ is the focal length of the variable form element, n is the refractive index of material forming the variable form element, $R_1$ is the radial dimension for the surface closest to the variable position element, and $R_2$ is the radial dimension for the other surface. In one example, the variable form element 304 comprises only one side with the convex shape, so $R_2$ is infinity, and the focal length of the variable form element ($f_{vf}$) becomes dependent on the radial dimension R of the shape S. In another example, the value for the focal length of the variable form element ($f_{vf}$) as illustrated in Equation 8 can be substituted into Equation 7, and the best focus distance P' can be calculated as discussed above, and as contemplated herein.

In embodiments of the focus elements such as the focus elements 100, 200, 300, the shape S can extend towards the variable position element, and in the particular example of FIG. 3 it is shown that the shape S can extend through the distal opening 316 and into the interior bore 314. The shape S can be caused by the force imparted to a deformable surface such as the deformable surface of the deformable side 324 at a plurality of force impartation points. Each of these points can have characteristics that vary depending on the shape of the force imparting structural element, e.g., the distal end 310 of the variable position element 302. Where the force imparting structural element is ring shaped (e.g., where the distal end 310, and the interior bore 314 are generally circular in cross-section) a plurality of force impartation points can be formed in a ring pattern about the optical axis 308.

Ring shaped force imparting structural elements as described herein have been shown as being circular; however, ring shaped force applying elements can also be non-circular, e.g., rectangular, square, triangular, etc. In one example, when the variable form element is a fluid-filled chamber, the pressure applied by the variable position element can be exerted in a direction substantially normal to the plane represented by the deformable surface of the deformable side. This may reduce the separation between the deformable surface (e.g., of the deformable side 324) and the opposite surface (e.g., on the object side 322) of the proposed fluid-filled chamber. In one example, the reduction in the separation proximate the area of the variable form element acted upon by the distal end of the variable position element around its circumference may force fluid from the periphery of the fluid chamber into the middle so as to change the shape S.

The change in shape S can vary one or more optical properties such as the amount of convergence (or divergence) of light that passes through the variable form element. To further illustrate this concept, it will be appreciated, for example, that certain shapes of the variable form element will cause light passing through the element to diverge, while certain other shapes of the variable form element will cause light passing through the element to converge. In one embodiment, the focus element can be operatively configured so that increasing the force that is applied to the variable focus element can change the curvature in the shape S of the deformable membrane so that the light becomes more converging.

Applying this concept to one embodiment of the focus elements described herein, if the shape S is initially concave, then light passing through the element will tend to diverge. As force on the variable focus element from the variable position element is increased, the shape S can tend to change in a direction that can cause the variable focus element to be more converging (and, in other words, less diverging). This change in the shape S can be from the initially concave configuration to a less concave configuration, to an infinite (or "flat") configuration, as well as to a convex configuration. In another embodiment, if the shape S is initially convex, then the light passing through the lens will tend to converge. Here it will be understood that as the force from the variable position element is increased, the shape S can tend to change in a direction that can cause the variable focus element to be more converging. That is, the shape S can tend to change to a more convex configuration, as compared to the initially convex configuration.

Figure 5:
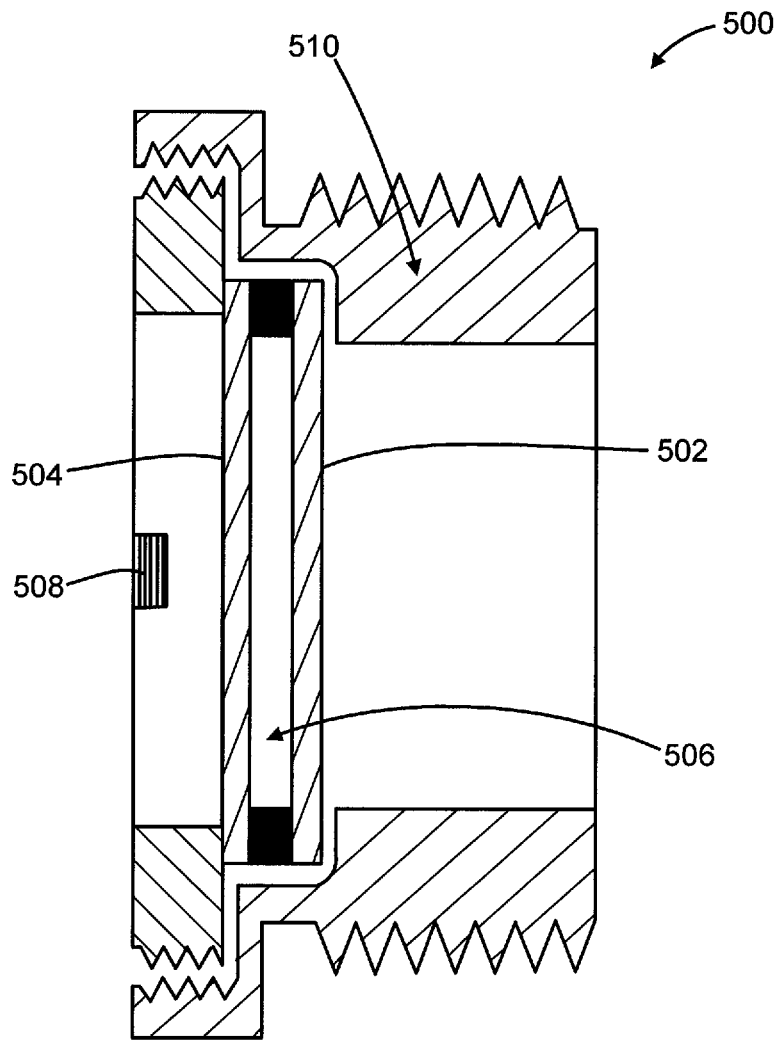
FIG. 5 is a side, cross-sectional view of an example of a variable form element that is made in accordance with concepts of the present invention, the variable form module being suitable for implementation in focus elements such as the focus elements of FIGS. 1-3.

Referring next to FIG. 5, an example of a variable form element 500 that is made in accordance with concepts of the present invention is illustrated. The variable form element 500 can comprise a deformable membrane 502, a boundary membrane 504, and a fluid chamber 506 formed therebetween. The variable form element 500 can also comprise a lock nut 508, and a housing 510 that is in surrounding relation to the deformable membrane 502, the boundary membrane 504, and the lock nut 508.

Although not illustrated as such, the variable form element 500 may comprise a single, deformable element, such as a fluid-filled elastomer, polymer, or plastic; for example a transparent oil-filled elastomer material. In other examples, the variable form module 500 may comprise two or more components (e.g., the deformable membrane 502, and the boundary membrane 504), with a focus fluid (such as water, or oil) entrapped or sandwiched in the fluid chamber 506 between, e.g., the deformable membrane 502 and the boundary membrane 504. Exemplary materials of the type for use as the deformable membrane 502 include, but are not limited to, polydimethylsiloxane ("PDMS"), such as Sylgard® 184 silicone elastomer, available from Dow Corning Corporation, Midland, Mich. The thickness of the deformable membrane 502 may be selected based on factors such as the size of the variable form element, desired focus distance(s), desired change in radial distance R, and compressibility, among many other properties consistent with the present invention disclosed and described herein. Suitable material thickness can be from about 0.1 mm to about 0.5 mm, and in one construction of the variable form element the thickness is from about 0.5 mm to about 2 mm.

When a focus fluid is used, its properties should be selected for compatibility with the other materials, stability under use, tolerance for the anticipated temperatures at which it will be used, and similar factors. Optical fluids and optical grade oils, such as optical grade mineral oils may be used. One suitable optical fluid is Type A immersion oil, available from Cargille-Sacher Laboratories, Inc., Cedar Grove, N.J. Another suitable fluid is Santovac® polyphenylether-based optical fluid SL-5267, available from Arch Technology Holding LLC, St. Charles, Mo. Water may also be used, such as deionized water. The focus fluid can also be PDMS fabricated in the form of a gel by using different mixing ratios of the base material with the curing agent such as the ratio of 55:1. In another implementation, the entire variable form element can consist of an appropriately shaped gel such as a gel with or without a deformable outer layer. Choosing a focus fluid with a relatively high index of refraction will reduce the amount of deformation in the deformable membrane that is needed to obtain a given change in focal length (and, to accommodate a given range of focus distances). In one example, a suitable index of refraction would be in the range from about 1.4 to about 1.6, such as an index from about 1.4 to about 1.5.

The boundary membrane 504 may be rigid, such as glass or plastic, or deformable such as an elastomer. Glass may be used and selected from amongst a variety of optical glass materials that are commercially available, including, for example, Corning® EAGLE2000™ Display Grade Glass, available form Corning Display Technologies, Corning, N.Y. Another example of suitable glass is N-BK7 glass, available from Schott North America, Inc., Duryea, Pa. The boundary membrane may be any suitable thickness, including from about 0.2 mm to about 1.5 mm, and in one particular construction from about 0.4 mm to about 0.6 mm.

The deformable membrane 502 and the boundary membrane 504 are generally optically clear, at least in the portion thereof used to transmit image information. So while the entirety of each such element, e.g., the deformable membrane 502, and the boundary membrane 504, would normally be optically clear in order to simplify manufacture and assembly, it is also possible for at least a part of an outer portion of either or both of the boundary membrane and the deformable membrane to be translucent or opaque, surrounding an inner portion that is optically clear.

The variable form element housing 510, and the locknut 508 to a lesser extent, are generally constructed of rigid materials, e.g., metals, plastics, and composites. Such materials can be manipulated using standard manufacturing processes and techniques, some of which are implemented to make the components of the variable form element 500 include casting, molding, extruding, machining (e.g., turning, and milling) and other techniques that are suitable for forming the housing 510 disclosed and described herein. Because these processes, and the materials that are utilized by such processes, are generally well-known to those having ordinary skill in the art, no additional details will be provided herein, unless such details are necessary to explain the embodiments and concepts of the present invention.

Figure 6:
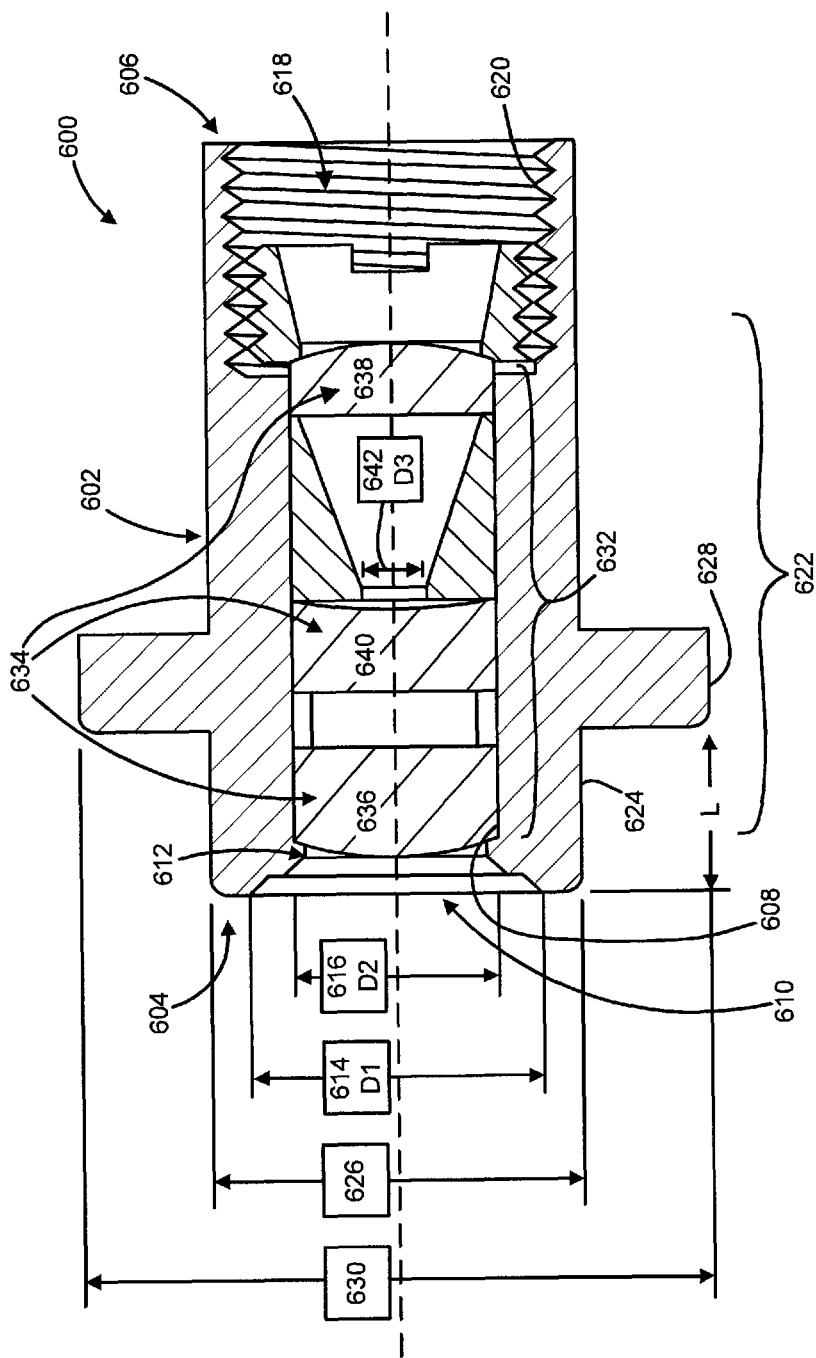
FIG. 6 is a side, cross-sectional view of an example of a variable position element that is made in accordance with concepts of the present invention, the variable position element being suitable for implementation in focus elements such as the focus elements of FIGS. 1-3.

FIG. 6 provides an illustration of an example of a variable position element 600 that is made in accordance with concepts of the present invention. The variable position element 600 can comprise a generally elongated barrel 602 with a distal end 604, a proximal end 606, and an interior bore 608 that extends therebetween. On the distal end 604, the interior bore 608 can comprise a distal opening 610 with a stepped portion 612, and by way of non-limiting example the stepped portion 612 can have a first diameter portion 614 with a first interior diameter D1, and a second diameter portion 616 with a second interior diameter D2, wherein the second diameter D2 is less than the first diameter D1. On the proximal end 606, the interior bore 608 can comprise a proximal opening 618, and an interior threaded portion 620. The interior bore 608 can also comprise a lens assembly region 622 that may extend between the second diameter portion 616 and the interior threaded portion 620.

The elongated barrel 602 can also have an outer barrel surface 624 with an outer barrel dimension 626, and a shoulder 628 that can be located a distance L from the distal end 604. The shoulder 628 can have an outer shoulder dimension 630. The variable position element 600 can further comprise a lens assembly 632 that can be positioned inside of the lens assembly region 622. This lens assembly 632 can comprise a number of lens elements 634, and in this example the lens elements 634 can have a first lens element 636 near the distal end 604, a second lens element 638 near the proximal end 606, and a third lens element 640 positioned between the first lens element 636 and the second lens element 638. An opening 642 with a diameter D3 can form the lens stop for the lens assembly in this example of the variable position element 600.

As mentioned briefly above, the lens assembly 632, and more particularly the lens elements 634 can be constructed of a variety of materials, using a variety of techniques. Each of the lens elements 634 can be formed monolithically, as in for example singular lens elements constructed of glass, polycarbonate, or other materials fabricated to appropriate prescriptions for the task at hand, and that can provide an optically clear path therethrough. In other examples, the lens elements 634 can be constructed as individual assemblies, each with for example multiple optical membranes, outer supportive features that hold the membranes together, as well as other materials, e.g., focus fluids. Still other examples of the lens assembly 632 may have additional structures and pieces that support, align, space, and/or position the lens elements 636 relative to one another, relative to the other pieces of the variable position element 600, as well as relative to other parts, e.g., the variable form element 500 (FIG. 4) when these parts are assembled together as in an indicia reading terminal device.

While the construction of these components can vary, the lens assembly 632 in certain implementations of the variable position element can be constructed as singlets, doublets, and triplets. The latter of these constructions can comprise three lens elements 634. In one example, the spacings, materials, and diameters of the lens elements 634 in the variable position element 600 is provided as illustrated in Table 1 below. Likewise, it is also contemplated that these lens elements can be further treated with coatings, and materials such as antireflection coatings (not shown), which can have properties that can further enhance the optical functionality of the treated lens elements, as well as the lens assembly.

TABLE 1

Example

| Lens Element | Surface | Radius of Curvature (mm) | Thickness (mm) | Material | Diameter (mm) |
|---|---|---|---|---|---|
| 1 | 1 | 4.650 | 1.5000 | Glass BK7 | 3 |
|   | 2 | Infinity | 0.6618 | Air |   |
| 2 | 3 | Infinity | 1.0000 | Glass SF11 | 3 |
|   | 4 | 7.060 | 0.1100 | Air |   |
| Stop | 5 | Infinity | 2.1840 | Air | 1.1294 |
| 3 | 7 | Infinity | 1.0800 | Glass BK7 | 3 |
|   | 8 | −6.200 | 7.0000 | Air |   |

The elongated barrel 602 is constructed of generally recognized materials that are compatible with the concepts disclosed and described herein. Exemplary materials may include metals (e.g, brass), plastics (e.g., polycarbonate), as well as composites, compositions, and combinations of the same. Differences and selection of the material may be based on the manufacturing techniques that are required such as those manufacturing techniques that provide for lower costs of construction, manufacture, etc. Coatings, such as paints, electro-coatings, and other surface treatments may be added to various portions of the barrel as necessary, and/or as required. Likewise, although not necessarily depicted in the example of FIG. 6, or in other examples that are illustrated in the drawings, fasteners and adhesives can be used to secure the various parts of the assembly to other parts of the assembly, such as, for example, for securing the lens element 636, 638, and/or 640 (and/or lens assembly 632) in position within the barrel 602.

Figure 7:
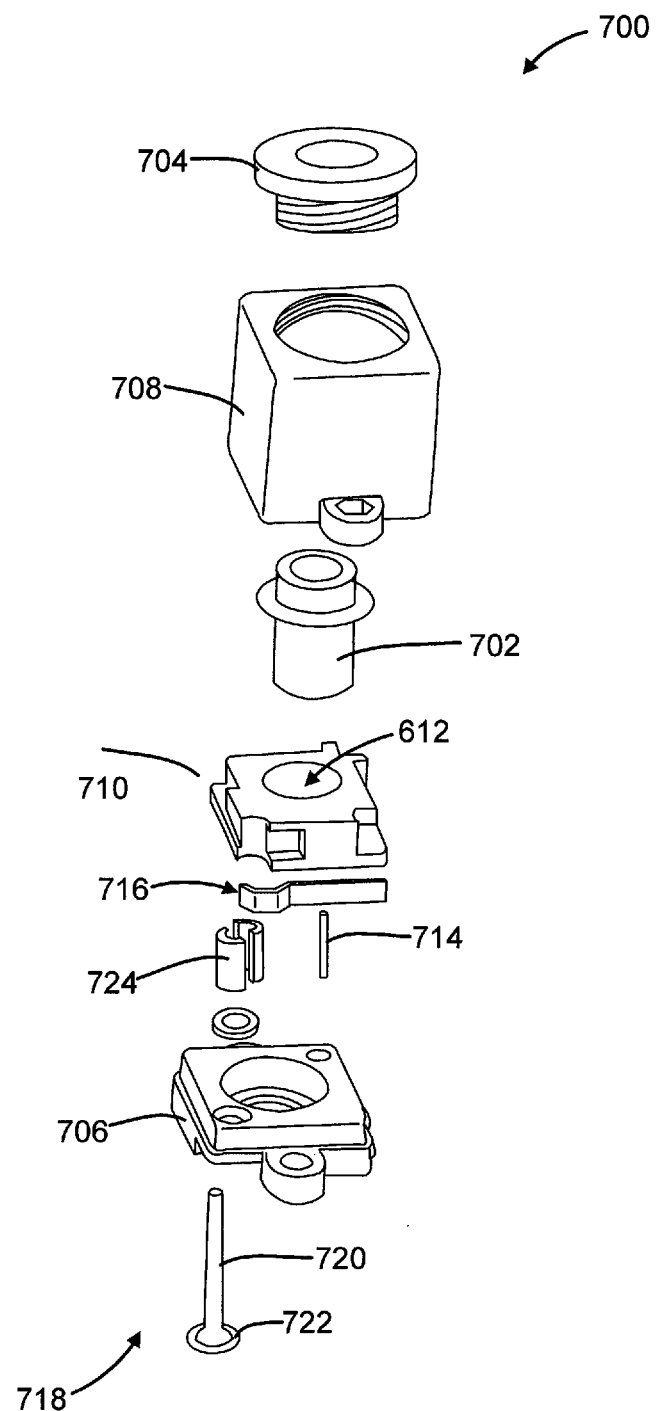
FIG. 7 is a perspective, exploded, assembly view of still another example of a focus element that is made in accordance with concepts of the present invention.
Figure 9:
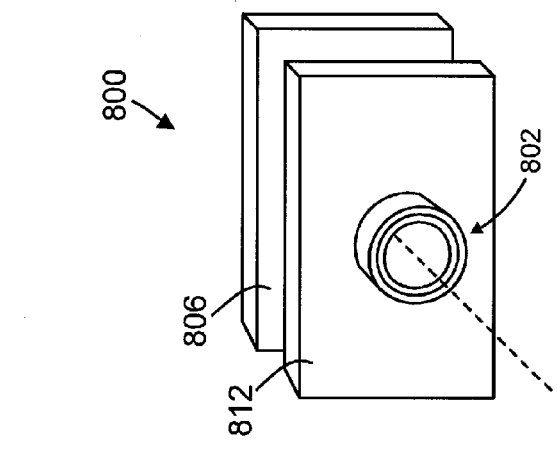
FIG. 9 is a perspective, assembled view of another example of an imaging module such as the imaging module of FIG. 8, for use with, and including a focus element such as the focus elements of FIGS. 1-3, and 7.
Figure 8:
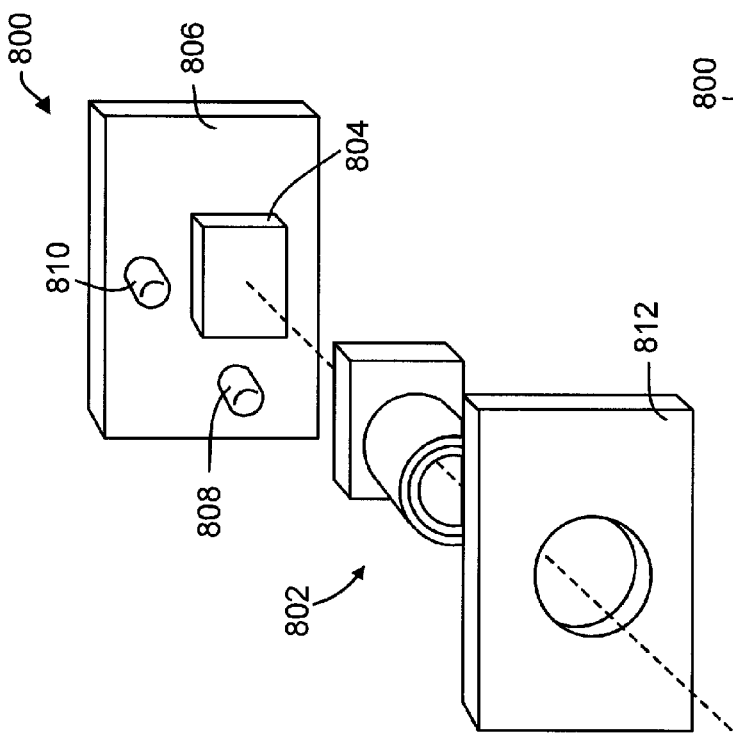
FIG. 8 is a perspective, exploded, assembly view of an example of an imaging module for use with, and including a focus element such as the focus elements of FIGS. 1-3, and 7.

Additional details and examples of the variable position element, and the variable form element are provided next in connection with one exemplary implementation of focus elements that is illustrated in FIGS. 7-9. For example, FIG. 7 illustrates an exploded, assembly view of a focus element 700 that is made in accordance with the present invention. Here, the focus element 700 comprises a variable position element 702, a variable form element 704, a base element 706, and a housing element 708. The focus element 700 also comprises a moveable platform 710 with a central aperture 712, a guide pin 714, a support spring 716, as well as an actuator assembly 718 that interacts with at least the movable platform 710 so as to induce relative movement between the variable position element 702, and the variable form element 704.

By way of non-limiting example, and as it is illustrated in FIG. 7, the actuator assembly 718 comprises a drive shaft 720, an actuator 722, and a coupling device 724 such as a pair of friction pads that couples the drive shaft 720 to the moveable platform 710. Actuators of the type used as the actuator 722 can be selected so as to provide movement of, e.g., the moveable platform 710 infinite, and acutely measured increments such as those increments generally associated with stepper motors, and more particularly with piezoelectric actuators. For example, piezoelectric actuators that can be used in one embodiment of the focus element 700 can have step increments that are less than about 15 µm, and more particularly the step increments are from about 5 µm to about 50 µm. Such step increments can be provided by linear and rotary actuators that are arranged in a manner that transmits motive forces from the actuator 722 to the movable platform 710 through the drive shaft 720. These include, for example, piezoelectric actuators to generate linear and/or rotational motion, as well as piezoelectric actuators with direct drive mechanisms, e.g., "squiggle motors." Examples of at least one linear piezoelectric actuator that can be incorporated into focus element 700 include a model number TULA35, available from Piezoelectric Technology Co., Ltd., of Seoul, South Korea. Moreover, details of the function, construction, and operation of piezoelectric actuators are generally recognized by those having ordinary skill in the arts, and therefore a detailed description of these aspects of the piezoelectric actuators are not provided unless necessary to explain certain concepts of the present invention.

Focus elements with features similar to focus element 700 (as well as the focus elements 100, 200, 300, and components discussed in connection with FIGS. 1-6 above) can be implemented as a part of an imaging module. An example of an imaging module 800 is illustrated in FIGS. 8 and 9, and described in more detail below. In one embodiment, the imaging module 800 comprises a focus element 802 (e.g., focus element 100, 200, 300, 700), and an image sensor integrated circuit 804 that is disposed on a printed circuit board 806 together with an illumination pattern light source bank 808, and aiming pattern light source bank 810. Here, each of the illumination bank 808, and the aiming bank 810 is provided as a single light source. The imaging module 800 can also include an optical plate 812 that has optics for shaping light from illumination bank 808, and the aiming bank 810 into predetermined patterns.

Figure 10:
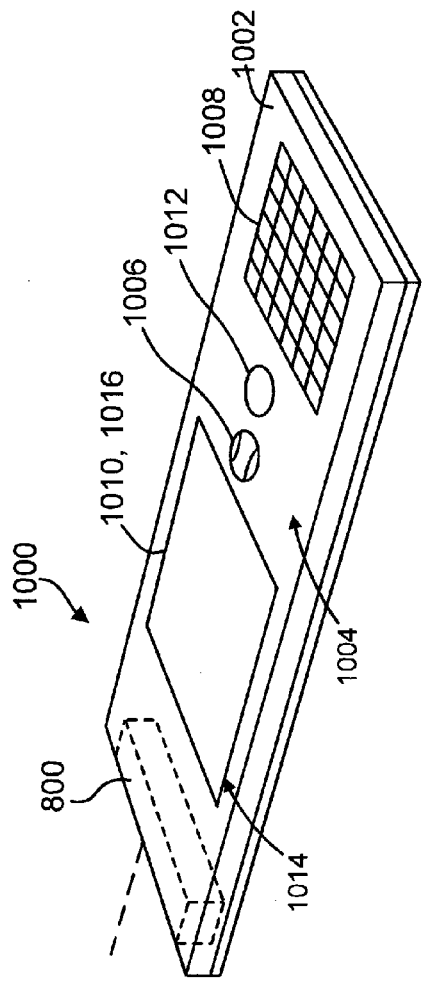
FIG. 10 is a perspective view of an indicia reading terminal incorporating an imaging module such as the imaging modules of FIGS. 8 and 9.

Imaging module 800 can be disposed in an indicia reading terminal 1000, an example of which is shown in FIG. 10. The indicia reading terminal 1000 can include a hand held housing 1002 that supports a user input interface 1004 with a pointer controller 1006, a keyboard 1008, a touch panel 1010, and a trigger 1012. The hand held housing 1002 can also support a user output interface 1014 with a display 1016.

Exemplary devices that can be used for devices of the user input interface 1002 are generally discussed immediately below. Each of these is implemented as part of, and often integrated into the hand held housing 1002 so as to permit an operator to input one or more operator initiated commands. These commands may specify, and/or activate certain functions of the indicia reading terminal. They may also initiate certain ones of the applications, drivers, and other executable instructions so as to cause the indicia reading terminal 1000 to operate in an operating mode.

Devices that are used for the point controller 1006 are generally configured so as to translate the operator initiated command into motion of a virtual pointer provided by a graphical user interface ("GUI") of the operating system of the indicia reading terminal 1000. It can include devices such as a thumbwheel, a roller ball, and a touch pad. In some other configurations, the devices may also include a mouse, or other auxiliary device that is connected, e.g., via wire, or wireless communication technology, to the indicia reading terminal 1000.

Implementation of the keyboard 1008 can be provided using one or more buttons, which are presented to the operator on the hand held housing 1002. The touch panel 1010 may supplement, or replace the buttons of the keyboard 1008. For example, one of the GUIs of the operating system may be configured to provide one or more virtual icons for display on, e.g., the display 1016, or as part of another display device on, or connected to the indicia reading terminal 1000. Such virtual icons (e.g., buttons, and slide bars) are configured so that the operator can select them, e.g., by pressing or selecting the virtual icon with a stylus (not shown) or a finger (not shown).

The virtual icons can also be used to implement the trigger 1012. On the other hand, other devices for use as the trigger 1012 may be supported within, or as part of the hand held housing 1002. These include, but are not limited to, a button, a switch, or a similar type of actionable hardware that can be incorporated into the embodiments of the indicia reading terminal 1000. These can be used to activate one or more of the devices of the portable data terminal, such as the bar code reader discussed below.

Displays of the type suited for use on the indicia reading terminal 1000 are generally configured to display images, data, and GUIs associated with the operating system and/or software (and related applications) of the indicia reading terminal 1000. The displays can include, but are not limited to, LCD displays, plasma displays, LED displays, among many others and combinations thereof. Although preferred construction of the portable data terminal 1000 will include devices that display data (e.g., images, and text) in color, the display that is selected for the display 1016 may also display this data in monochrome (e.g., black and white). It may also be desirable that the display 1016 is configured to display the GUI, and in particular configurations of the indicia reading terminal 1000 that display 1016 may have an associated interactive overlay, like a touch screen overlay. This permits the display 1016 to be used as part the GUI so as to permit the operator to interact with the virtual icons, the buttons, and other implements of the GUI to initiate the operator initiated commands, e.g., by pressing on the display 1016 with the stylus (not shown) or finger (not shown).

The hand held housing 1002 can be constructed so that it has a form, or "form factor" that can accommodate some, or all of the hardware and devices mentioned above, and discussed below. The form factor defines the overall configuration of the hand held housing 1002. Suitable form factors that can be used for the hand held housing 1002 include, but are not limited to, cell phones, mobile telephones, personal digital assistants ("PDA"), as well as other form factors that are sized and shaped to be held, cradled, and supported by the operator, e.g., in the operator's hand(s) as a gun-shaped device. One exemplary form factor is illustrated in the embodiment of the indicia reading terminal 1000 that is illustrated in the present FIG. 10.

Figure 11:
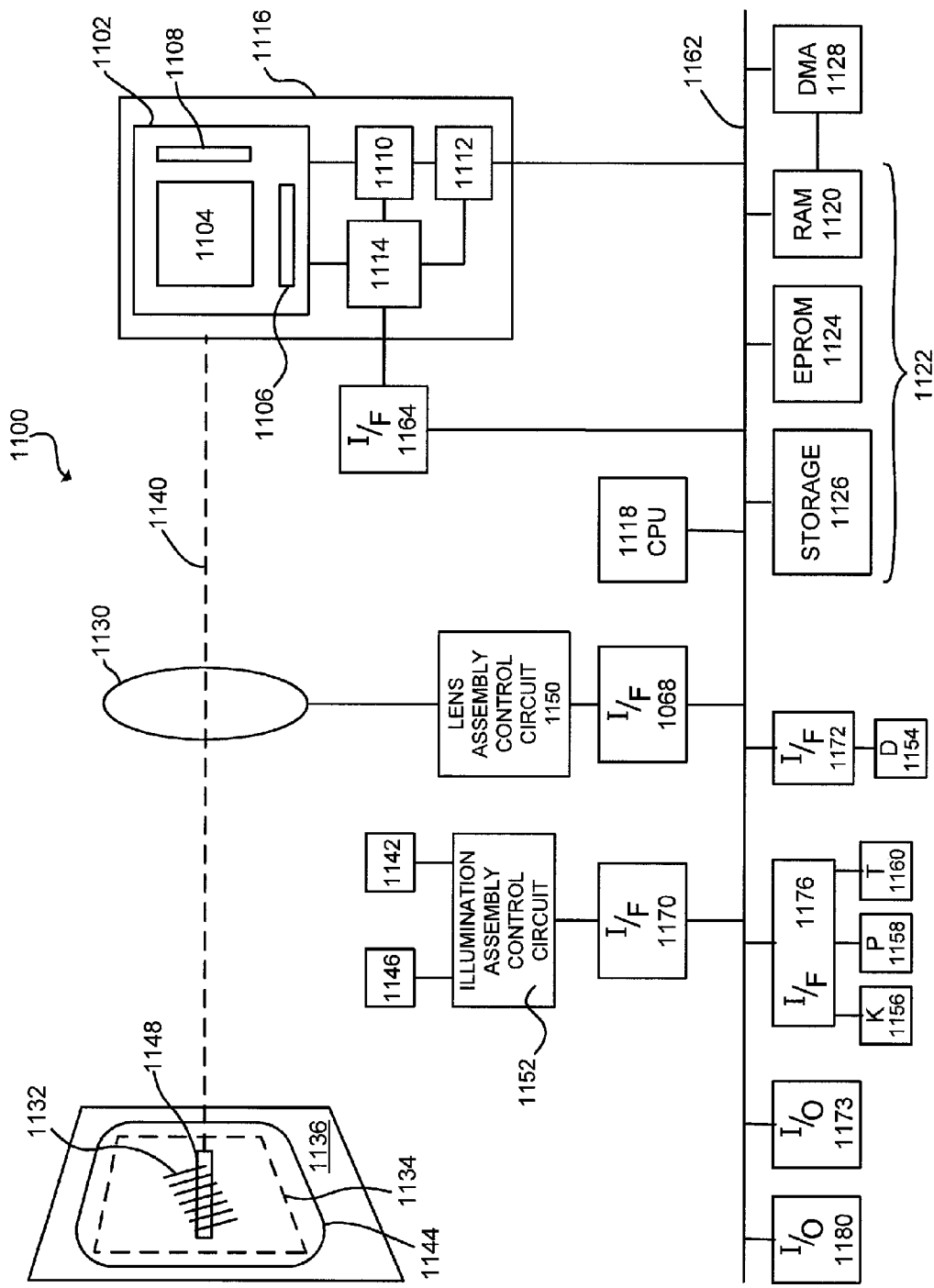
FIG. 11 is a block diagram of an exemplary hardware platform for implementation in an indicia reading terminal such as the indicia reading terminal of FIG. 10.

An exemplary hardware platform for use in, e.g., the indicia reading terminal 1100 is illustrated and described with reference to the schematic, block diagram of FIG. 11. In FIG. 11, it is seen that an indicia reading terminal 1100 can include an image sensor 1102 comprising a multiple pixel image sensor array 1104 having pixels arranged in rows and columns of pixels, associated column circuitry 1106 and row circuitry 1108. Associated with the image sensor 1102 can be amplifier circuitry 1110, and an analog to digital converter 1112 which converts image information in the form of analog signals read out of image sensor array 1104 into image information in the form of digital signals. Image sensor 1102 can also have an associated timing and control circuit 1114 for use in controlling, e.g., the exposure period of image sensor 1102, and/or gain applied to the amplifier 1110. The noted circuit components 1102, 1110, 1112, and 1114 can be packaged into a common image sensor integrated circuit 1116. In one example, image sensor integrated circuit 1116 can be provided by an MT10V022 image sensor integrated circuit available from Micron Technology, Inc. In another example, image sensor integrated circuit 1116 can incorporate a Bayer pattern filter. In such an embodiment, CPU 1118 prior to subjecting a frame to further processing can interpolate pixel values intermediate of green pixel values for development of a monochrome frame of image data. In other embodiments, red, and/or blue pixel values can be utilized for the image data.

In the course of operation of terminal 1100 image signals can be read out of image sensor 1102, converted and stored into a system memory such as RAM 1120. A memory 1122 of terminal 1100 can include RAM 1120, a nonvolatile memory such as EPROM 1124, and a storage memory device 1126 such as may be provided by a flash memory or a hard drive memory. In one embodiment, terminal 1100 can include CPU 1118 which can be adapted to read out image data stored in memory 1122 and subject such image data to various image processing algorithms. Terminal 1100 can include a direct memory access unit (DMA) 1128 for routing image information read out from image sensor 1102 that has been subject to conversion to RAM 1120. In another embodiment, terminal 1100 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1102 and RAM 1120 are within the scope and the spirit of the invention.

Referring to further aspects of terminal 1100, terminal 1100 can include an imaging lens assembly 1130 for focusing an image of a decodable indicia 1132 located within a field of view 1134 on a substrate 1136 onto image sensor array 1002. Imaging light rays can be transmitted about an optical axis 1140. Lens assembly 1130 can be adapted to be capable of multiple focal lengths and/or multiple best focus distances, such as for example has been discussed above in connection with the focus elements 100, 200, 300, 700.

Terminal 1100 can also include an illumination pattern light source bank 1142 for generating an illumination pattern 1144 substantially corresponding to the field of view 1134 of terminal 1100, and an aiming pattern light source bank 1146 for generating an aiming pattern 1148 on substrate 1136. In use, terminal 1100 can be oriented by an operator with respect to a substrate 1136 bearing decodable indicia 1132 in such manner that aiming pattern 1148 is projected on a decodable indicia 1132. In the example of FIG. 11, the decodable indicia 1132 is provided by a 1D bar code symbol. Decodable indicia could also be provided by 2D bar code symbols or optical character recognition (OCR) characters.

Each of illumination pattern light source bank 1142 and aiming pattern light source bank 1146 can include one or more light sources. Lens assembly 1130 can be controlled with use of lens assembly control circuit 1150 and the illumination assembly comprising illumination pattern light source bank 1142 and aiming pattern light source bank 1146 can be controlled with use of illumination assembly control circuit 1152. Lens assembly control circuit 1150 can send signals to lens assembly 1130, e.g., for changing a focal length and/or a best focus distance of lens assembly 1130. This can include for example providing a signal to the piezoelectric actuator to change the position of the variable position element of the focus element discussed above. Illumination assembly control circuit 1152 can send signals to illumination pattern light source bank 1142, e.g., for changing a level of illumination output by illumination pattern light source bank 1142.

Terminal 1100 can also include a number of peripheral devices such as display 1154 for displaying such information as image frames captured with use of terminal 1100, keyboard 1156, pointing device 1158, and trigger 1160 which may be used to make active signals for activating frame readout and/or certain decoding processes. Terminal 1100 can be adapted so that activation of trigger 1160 activates one such signal and initiates a decode attempt of the decodable indicia 1132.

Terminal 1100 can include various interface circuits for coupling several of the peripheral devices to system address/data bus (system bus) 1162, for communication with CPU 1118 also coupled to system bus 1162. Terminal 1100 can include interface circuit 1164 for coupling image sensor timing and control circuit 1114 to system bus 1162, interface circuit 1168 for coupling lens assembly control circuit 1150 to system bus 1162, interface circuit 1170 for coupling illumination assembly control circuit 1152 to system bus 1162, interface circuit 1172 for coupling display 1154 to system bus 1162, and interface circuit 1176 for coupling keyboard 1156, pointing device 1158, and trigger 1160 to system bus 1162.

In a further aspect, terminal 1100 can include one or more I/O interfaces 1178, 1180 for providing communication with external devices (e.g., a cash register server, a store server, an inventory facility server, a peer terminal 1100, a local area network base station, a cellular base station). I/O interfaces 1178, 1180 can be interfaces of any combination of known computer interfaces, e.g., Ethernet (IEEE 802.3), USB, IEEE 802.11, Bluetooth, CDMA, and GSM.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

While the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. An optical system comprising:
a first optical element having an optical axis and a focal length, the first optical element comprising a deformable element; and
a second optical element aligned with the optical axis and having a ring shaped end, the second optical element having a plurality of positions along the optical axis, the positions comprising a first position, and a second position that is different than the first position, wherein the second optical element includes a lens assembly having a lens element, wherein a position of the lens element changes with a position of the second optical element,
wherein the second position on the optical axis locates the ring shaped end of the second optical element in communication with the deformable element so as to cause the deformable element to deform in a manner that changes the focal length from a first focal length to a second focal length that is different from the first focal length.

2. An optical system according to claim 1, wherein the deformation causes a shape in the deformable element, and wherein the focal length of the first optical element changes from a first value to a second value in accordance with changes in a dimension of the shape.

3. An optical system according to claim 1, wherein the deformable element comprises a deformable membrane forming a portion of a fluid chamber with a focus fluid disposed therein, and wherein the end of the second optical element contacts the deformable membrane.

4. An optical system according to claim 1, wherein the second optical element has a fixed focal length.

5. An optical system according to claim 1, further comprising a lens assembly disposed in the second optical element, the lens assembly comprising at least one lens element.

6. An optical system according to claim 1, further comprising an actuator assembly coupled to the second optical element, the actuator assembly comprising a piezoelectric actuator, and a drive shaft coupled to the piezoelectric actuator so as to change the first position to the second position.

7. An optical system according to claim 1, wherein the end of the second optical element comprises a ring-shape having a circular cross-section.

8. An optical system according to claim 1, wherein the second focal length causes light to be more convergent than the first focal length.

9. A hand held indicia reading terminal for use in reading of decodable indicia, said hand held indicia reading terminal comprising:
an image sensor;
an optical system for use in focusing an image onto the image sensor, the optical system comprising a first optical element having an optical axis and a focal length, the first optical element comprising a deformable element, and a second optical element aligned with the optical axis and having a ring shaped end, the second optical element having a plurality of positions along the optical axis, the positions comprising a first position, and a second position having a separation distance that is different from the first position, the separation distance measuring the position of the first optical element relative to the second optical element, wherein the second optical element includes a lens assembly having a lens element, wherein a position of lens element changes with a position of the second optical element, and
a hand held housing in surrounding relation to one or more of the image sensor, and the optical system,
wherein the second position on the optical axis locates the ring shaped end of the second optical element in communication with the deformable element so as to cause the deformable element to deform in a manner that changes the focal length of the first optical element from a first focal length to a second focal length that is different from the first focal length.

10. A hand held indicia reading terminal according to claim 9, further comprising one or more of an aimer, and an illuminator.

11. A hand held indicia reading terminal according to claim 9, wherein the hand held indicia reading terminal is operative to decode decodable indicia located at a focus distance from the deformable element, and wherein the focus distance is correlated to the separation distance as approximated in accordance with, $$P' = f_{vf}\left(\frac{S_P L_{vf} - S_P^2 - f_{vp}L_{vf}}{S_P L_{vf} - S_P^2 - f_{vp}L_{vf} - f_{vf}L_{vf} + f_{vf}S_P + f_{vp}f_{vf}}\right)$$

where P' is the focus distance, $S_P$ is the separation distance, $L_{vf}$ is the distance from the image sensor to the first optical element, $f_{vf}$ is the focal length of the first optical element, and $f_{vp}$ is a focal length of the second optical element.

12. A hand held indicia reading terminal according to claim 9, wherein the deformable element further comprises,
a deformable membrane;
a boundary element in peripheral communication with the deformable membrane so as to form a fluid chamber; and
a focus fluid disposed in the fluid chamber.

13. A hand held indicia reading terminal according to claim 9, further comprising a piezoelectric actuator coupled to the second optical element, wherein the piezoelectric actuator is operatively configured to change the first position to the second position.

14. A hand held indicia reading terminal according to claim 9, wherein the second optical element comprises an elongated barrel, and a plurality of lens elements disposed in the elongated barrel.

15. A method of focusing an image of a decodable indicia on an image capture device, said method comprising:
securing on an optical axis a variable form element having a focal length, the variable form element comprising a deformable element;
aligning on the optical axis a variable position element at a separation distance measuring the position of the variable position element relative to the variable form element, the variable position element comprising an elongated barrel, having a ring shaped end for use in deforming the deformable element, and a lens assembly having a lens element disposed in the elongated barrel, the lens assembly having a fixed focal length, wherein a position of the lens element changes with a position of the variable position element; and
setting the separation distance for attempting to decode a decodable indicia located at a focus distance from the variable form element by correlating the focus distance to the separation distance.

16. A method according to claim 15, wherein the focus distance is correlated to the separation distance as approximated in accordance with, $$P' = f_{vf}\left(\frac{S_P L_{vf} - S_P^2 - f_{vp}L_{vf}}{S_P L_{vf} - S_P^2 - f_{vp}L_{vf} - f_{vf}L_{vf} + f_{vf}S_P + f_{vp}f_{vf}}\right),$$

where P' is the focus distance, $S_P$ is the separation distance, $L_{vf}$ is the distance from the image capture device to the variable form element, $f_{vf}$ is the focal length of the variable form element, and $f_{vp}$ is the fixed focal length of the lens assembly.

17. A method according to claim 15, further comprising deforming the deformable element with an end of the elongated barrel, the end causing a shape in the deformable element having a dimension to change, wherein the focal length of the variable form element changes from a first value to a second value in accordance with changes in the dimension of the shape.

18. A method according to claim 17, wherein the end of the second element comprises a ring shape having a circular cross-section, wherein the deformable element comprises a deformable membrane that forms a part of a fluid chamber having a material disposed therein, and wherein the end contacts the deformable membrane.

19. A method according to claim 15, further comprising positioning the variable position element at the separation distance with an actuator assembly comprising a piezoelectric actuator coupled to the elongated barrel.

20. A method according to claim 19, wherein the actuator assembly further comprises a drive shaft, and a moveable platform secured to the variable position element, and wherein the drive shaft transmits motive forces from the piezoelectric actuator to the moveable platform.

* * * * *